(12) United States Patent
Marchal et al.

(10) Patent No.: US 10,279,701 B2
(45) Date of Patent: May 7, 2019

(54) METHOD OF REGULATING THE TEMPERATURE OF AN ACCUMULATOR BATTERY

(71) Applicant: RENAULT S.A.S., Boulogne-Billancourt (FR)

(72) Inventors: Caroline Marchal, Montigny-le-Bretonneux (FR); Philippe Recouvreur, Montrouge (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/761,183

(22) PCT Filed: Feb. 4, 2014

(86) PCT No.: PCT/FR2014/050199
§ 371 (c)(1),
(2) Date: Jul. 15, 2015

(87) PCT Pub. No.: WO2014/125189
PCT Pub. Date: Aug. 21, 2014

(65) Prior Publication Data
US 2016/0031334 A1    Feb. 4, 2016

(30) Foreign Application Priority Data

Feb. 15, 2013 (FR) ...................... 13 51335

(51) Int. Cl.
*B60L 11/18* (2006.01)
*B60L 3/12* (2006.01)
(Continued)

(52) U.S. Cl.
CPC .............. *B60L 11/187* (2013.01); *B60L 3/12* (2013.01); *B60L 11/1803* (2013.01);
(Continued)

(58) Field of Classification Search
CPC ..................................................... B60L 11/187
See application file for complete search history.

(56) References Cited

U.S. PATENT DOCUMENTS

| 6,163,135 | A | * | 12/2000 | Nakayama | ............. | B60K 6/445 |
| | | | | | | 320/150 |
| 2002/0062183 | A1 | * | 5/2002 | Yamaguchi | ............. | B60K 6/46 |
| | | | | | | 701/22 |

(Continued)

FOREIGN PATENT DOCUMENTS

| FR | 2967303 A1 | 5/2012 |
| JP | 7-73907 A | 3/1995 |

(Continued)

OTHER PUBLICATIONS

International Search Report dated May 20, 2014 in PCT/FR2014/050199 filed Feb. 4, 2014.

(Continued)

*Primary Examiner* — Imran K Mustafa
(74) *Attorney, Agent, or Firm* — Oblon, McClelland, Maier & Neustadt, L.L.P.

(57) ABSTRACT

A method of regulating temperature of an accumulator battery in a course of charging or discharging. The method includes: a) acquiring a state of charge relating to a level of charge of the accumulator battery, b) measuring values of the temperature of the accumulator battery at a first state of charge and at a second state of charge which is different, c) estimating, as a function of the values of the temperature measured in b), the value of the temperature of the accumulator battery at a future third state of charge, and d) controlling the temperature of the accumulator battery as a function of the value of the temperature estimated in c).

19 Claims, 1 Drawing Sheet

Figure 1:
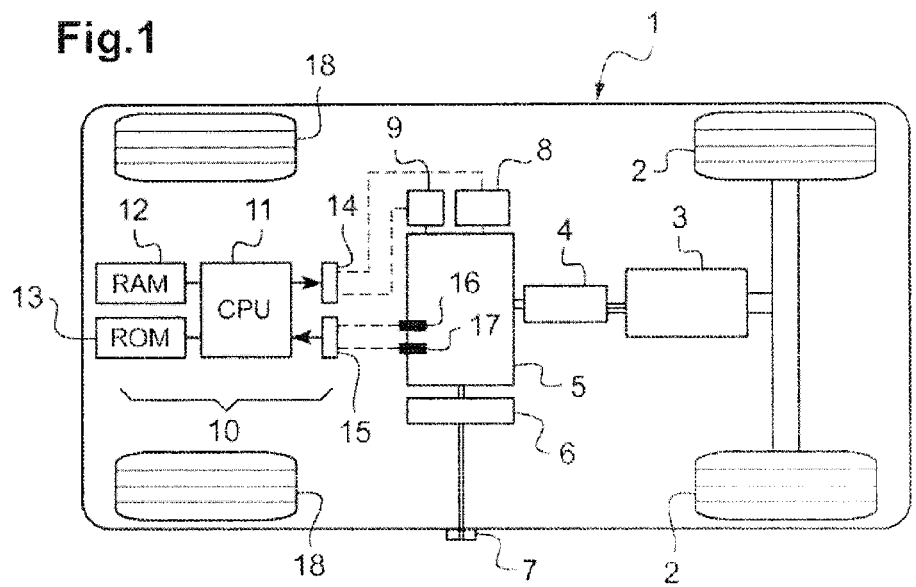

(51) Int. Cl.
 H01M 10/44 (2006.01)
 H01M 10/625 (2014.01)
 H01M 10/615 (2014.01)
 H01M 10/633 (2014.01)
 H01M 10/613 (2014.01)
 H01M 10/657 (2014.01)

(52) U.S. Cl.
 CPC ....... B60L 11/1809 (2013.01); B60L 11/1862 (2013.01); B60L 11/1874 (2013.01); B60L 11/1875 (2013.01); H01M 10/44 (2013.01); H01M 10/443 (2013.01); H01M 10/613 (2015.04); H01M 10/615 (2015.04); H01M 10/625 (2015.04); H01M 10/633 (2015.04); H01M 10/657 (2015.04); *B60L 2240/545* (2013.01); *B60L 2240/547* (2013.01); *B60L 2240/549* (2013.01); *B60L 2240/662* (2013.01); *B60L 2260/56* (2013.01); *H01M 2220/20* (2013.01); *Y02T 10/705* (2013.01); *Y02T 10/7005* (2013.01); *Y02T 10/7044* (2013.01); *Y02T 10/7291* (2013.01); *Y02T 90/16* (2013.01)

(56) References Cited

U.S. PATENT DOCUMENTS

| | | | |
|---|---|---|---|
| 2009/0024256 A1 | 1/2009 | Adams et al. | |
| 2009/0058366 A1* | 3/2009 | Masuda | B60W 10/24 320/135 |
| 2011/0316486 A1* | 12/2011 | Inaba | B60L 1/003 320/150 |
| 2012/0200257 A1* | 8/2012 | Schwarz | H01M 10/42 320/109 |
| 2013/0245874 A1* | 9/2013 | Magnet | B60K 6/48 701/22 |
| 2013/0300361 A1 | 11/2013 | Origuchi et al. | |

FOREIGN PATENT DOCUMENTS

| | | | |
|---|---|---|---|
| JP | 201318187 A | * | 9/2013 |
| JP | 2013181875 A | * | 9/2013 |

OTHER PUBLICATIONS

French Search Report dated Nov. 5, 2013 in FR1351335 filed Feb. 15, 2013.

* cited by examiner

METHOD OF REGULATING THE TEMPERATURE OF AN ACCUMULATOR BATTERY

TECHNICAL FIELD OF THE INVENTION

The present invention relates to accumulator batteries in general.

More specifically, it relates to a method of regulating the temperature of an accumulator battery in the course of charging or discharging.

It also relates to a motor vehicle provided with an accumulator battery, a charger for said accumulator battery, an electric motor supplied by said accumulator battery, means for the acquisition of the charge state of said accumulator battery, means for the measurement of temperature in said accumulator battery, and means for the control of temperature in said accumulator battery.

TECHNOLOGICAL BACKGROUND

A motor vehicle of the above-mentioned type is known from the document US2011/0316486.

In a vehicle of this type, the aim is generally to charge the accumulator battery in a nominal temperature range, within which the accumulator battery delivers an optimum charge performance.

Below this temperature range, the battery charging process will be longer and incomplete. The battery will also show a lower independent capacity and reduced performance capabilities.

Above this temperature range, any charging or discharging of the accumulator battery has a negative impact upon the service life of said battery.

The above-mentioned document therefore includes provision, during the charging of the accumulator battery only, for the heating or cooling of said battery using means of temperature control, such that the battery temperature is restricted within the nominal temperature range.

However, while this solution is effective, it involves excessive electricity consumption for the supply of the means of temperature control. It is therefore difficult to apply when the battery is discharging for the supply of current to the electric motor. Moreover, this solution does not permit the adaptation of temperature control to driver behavior, given that the phenomenon of heat-up is accentuated in case of severe driving conditions.

OBJECT OF THE INVENTION

In order to rectify the above-mentioned drawback of the prior art, the present invention proposes the adaptation of the electric power supply to the means of temperature control in accordance with conditions encountered, by the principle of learning, specifically the learning of the driving profile of the user.

More specifically, according to the invention, a regulating method is proposed, as defined in the introduction, which includes provision for the following steps:
a) the acquisition of successive values of the charge state, which is relative to the level of charge in said accumulator battery,
b) the measurement of two values of the temperature of said accumulator battery when said charge state successively assumes a first value and a second value.
c) the estimation, as a function of the values of the temperature measured in step b), of the value of the temperature in said accumulator battery once said charge state has achieved a third value, and
d) the command of the means of control for the temperature of said accumulator battery, as a function of the value of the temperature estimated in step c).

Accordingly, by means of the invention, it is possible to measure temperature fluctuations in the accumulator battery when the charge state varies between its first and second values, to deduce therefrom a probable temperature fluctuation in the battery associated with the variation in the charge state between its second and third values, and to effect the optimum regulation of the means of control, thereby reducing the electric power consumption of said means of control.

The invention also provides a more reliable means of ensuring that the temperature of the accumulator battery remains within its nominal range.

Further advantageous characteristics of the regulating method according to the invention, which are not provided by way of limitation, are as follows:
- said step a) is effected continuously, or is repeated at regular and limited time intervals;
- steps b) to d) are repeated in a looped cycle;
- said first, second and third values of the charge state are predetermined;
- at least one of said first, second and third values of the charge state is determined as a function of the value of the charge state of the accumulator battery at the start of charging or discharging;
- step c) is executed using an affine mathematical function which associates a corresponding temperature with each charge state;
- in step d), said means of control are regulated such that the temperature of the accumulator battery reaches a target value;
- said target value is predetermined; or
- said target value is determined as a function of one and/or other of the following parameters: the exterior temperature, the first, second or third value of said charge state, information to the effect that the accumulator battery is charging or discharging, the average discharging time of said accumulator battery, the average charging time of said accumulator battery.

The invention also proposes a motor vehicle, as defined in the introduction, which is also provided with a command unit for said means of control which is suitable for the deployment of a regulating method as defined above.

DETAILED DESCRIPTION OF AN EXAMPLE OF EMBODIMENT

The following description, in conjunction with the attached drawings, which are provided by way of examples and not by way of limitation, clarifies the substance of the invention and the means whereby it can be executed.

Figure 2:
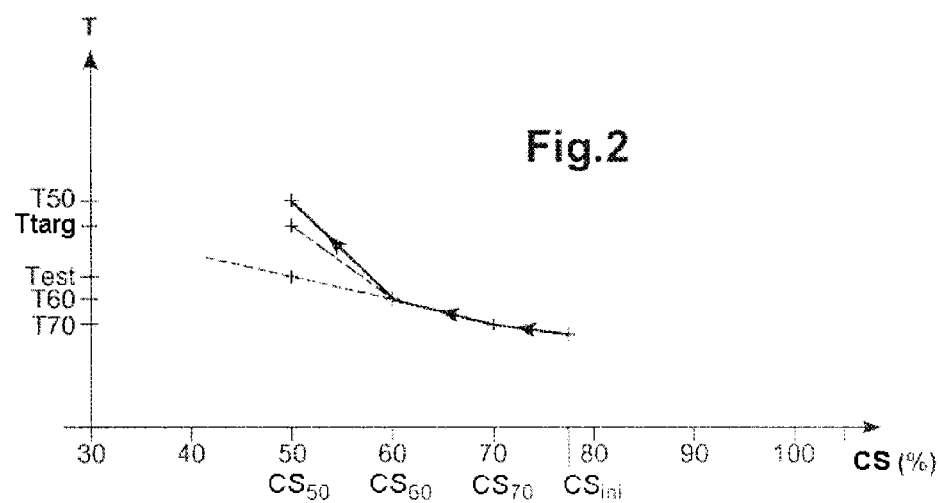

In the attached drawings:

FIG. 1 shows a schematic representation of a motor vehicle according to the invention, and FIG. 2 shows a graph which illustrates the temperature movement in an accumulator battery of the motor vehicle represented in FIG. 1, as a function of the charge stage of said accumulator battery, during the discharging of said battery.

FIG. 1 shows a highly schematic representation of a motor vehicle 1, which is provided with two driving wheels 2 and two non-driving wheels 18.

The vehicle represented is an electric vehicle. As a variant, a hybrid vehicle might also be considered.

The motor vehicle 1 represented in FIG. 1 is therefore provided with an electric motor 3 for the rotary propulsion of the two driving wheels 2.

It is also provided with an accumulator battery 5 for the supply of current to said electric motor 3 via an inverter 4. Conventionally, said inverter 4 is designed for the transformation of the DC output of the accumulator battery 5 into a three-phase current.

The motor vehicle 1 is also provided with a charger 6 equipped with a power socket 7, which is accessible to the user for the insertion of an electric plug connected to an external electric power system. Said charger 6 is designed for the regulation of the power delivered by the external electric power system in order to ensure the optimum charging of the accumulator battery 5.

The motor vehicle 1 is also provided with control means 8, 9 for the temperature T of the accumulator battery 5.

As represented in FIG. 1, said control means are specifically comprised of a means of heating 8 and a means of cooling 9 of the accumulator battery 5. Said means of heating 8 and of cooling 9 may be separate (configured, for example, in the form of an electric resistance and an electric fan) or combined (configured, for example, in the form of a Peltier cell).

In any event, said means of heating 8 and of cooling 9 will require energy for the purposes of operation. This energy is sourced, whether directly or indirectly, from the accumulator battery 5, such that the optimum economization thereof will provide a means of enhancing the independent operating capacity of the motor vehicle 1 (particularly when the accumulator battery is discharging for the supply of power to the electric motor). This is also the object of the present invention.

To this end, the motor vehicle 1 is provided with means of measurement 17 for the temperature T in said accumulator battery 5, and with means for the acquisition 16 of the charge state CS of the accumulator battery 5.

Conventionally, the means of measurement 17 may be configured in the form of a temperature probe installed in the interior of the accumulator battery 5.

The means of acquisition 16 is designed to determine the level of charge in the accumulator battery. The charge state recorded therein is expressed as a percentage.

Said charge state CS is considered equal to 100% when the level of charge in the accumulator battery is at its maximum. It decreases as the accumulator battery 5 feeds power to the electric motor 3. It increases when the accumulator battery 5 is supplied by the charger 6.

For the control of its various devices, the motor vehicle 1 is provided with a computer 10 comprised of a processor 11 (CPU), a random access memory 12 (RAM), a read-only memory 13 (ROM) and various input 15 and output 14 interfaces.

By means of its input interfaces 15, the computer 10 is able to receive input signals originating from the means of measurement 17 and the means of acquisition 16. Accordingly, it is designed for the acquisition of the temperature T and the charge state CS of the accumulator battery 5.

By means of a software installed in its read-only memory 13, the computer 10 is designed to calculate, for each condition of service of the motor vehicle 1, control instructions for the means of heating 8 and of cooling 9.

Finally, by means of its output interfaces 14, the computer 10 is able to transmit these control instructions to the means of heating 8 and of cooling 9, in order to ensure the optimum regulation of the temperature of the accumulator battery 5.

According to a particularly advantageous characteristic of the invention, the computer 10 is designed for the deployment of a regulating method for the temperature T of the accumulator battery 5 which comprises the following constituent steps:

a) the acquisition of successive values $CS_{60}$, $CS_{70}$ for the charge state CS, b) the measurement of two temperature values T in the accumulator battery 5, a first value $T_{70}$ of which corresponding to when the charge stage achieves a first value $CS_{70}$, and the second value $T_{60}$ corresponding to when the charge state achieves a second value $CS_{60}$, c) the estimation, as a function of the values $T_{60}$, $T_{70}$ measured in step b), of the value $T_{est}$ of the temperature T in the accumulator battery 5 once the charge state CS has achieved a third value $CS_{50}$, and d) the command of the means of heating 8 and of cooling 9 as a function of the value $T_{est}$ estimated in step c).

In the remainder of the present description, each of the steps a) to d) is described in greater detail, with reference to FIG. 2.

In FIG. 2, the solid line represents the movement in the temperature T of the accumulator battery 5 as a function of the charge state CS, when the accumulator battery 5 is supplying the electric motor 3 and is discharging as a result.

Step a) for the acquisition of successive values of the charge state CS is preferably executed continuously, using the means of acquisition 16.

Naturally, this step can be executed at regular intervals, provided that the time interval concerned is limited. This time interval will preferably be equal to or less than 5 minutes.

According to the example represented in FIG. 2, it will be observed that the value $CS_{ini}$ of the charge state CS upon the start-up of the motor vehicle is approximately 75%. The value of the charge state CS then decreases progressively down to 50%.

It will also be observed from this figure that the temperature T rises as the accumulator battery 5 discharges.

Step b) involves, when the charge stage CS achieves the first value $CS_{70}$, the measurement of the first value $T_{70}$ of the temperature T in the accumulator battery 5 then, when the charge stage CS achieves the second value $CS_{60}$, the measurement of the second value $T_{60}$ of the temperature T in the accumulator battery 5.

In the example represented in FIG. 2, the values $CS_{60}$ and $CS_{70}$ for the charge stage CS, at which the temperature T of the accumulator battery 5 is measured, are predetermined.

In this case, the values of $CS_{60}$ and $CS_{70}$ are chosen to be equal to multiples of 10% (10%, 20%, etc.). Accordingly, the first value $T_{70}$ of the temperature T is measured for a value $CS_{70}$ of the charge state equal to 70%, and the second value $T_{60}$ of the temperature T is measured for a value $CS_{60}$ of the charge state CS equal to 60%.

As a variant, these values $CS_{60}$ and $CS_{70}$ for the charge stage CS may be determined otherwise.

As an example, these values may be determined as a function of the value $(CS_{ini})$ of the charge state of the accumulator battery at the start of discharging (upon the start-up of the electric motor). In this case, in the example considered, the first temperature value would be measured when the value of the charge state is equal to 75%, and the second temperature value would be measured when the value of the charge state is equal to 65%.

As a further variant, the temperature in the accumulator battery may be measured at a higher frequency (e.g. for every 5% increment of discharging). However, this frequency must not be too high, such that the differences between the two temperature values measured are representative of the thermal inertia of the accumulator battery.

Step c) is a predictive step which involves the estimation, as a function of the values $T_{60}$, $T_{70}$ of the temperature T measured in step b), of the value $T_{est}$ of the temperature T in the accumulator battery 5 once the charge state CS has achieved a third value $CS_{50}$.

Here again, this third value $CS_{50}$ is predetermined. The value is chosen to be 10% lower than the second value $CS_{60}$.

As a variant, this third value may be determined otherwise, specifically as a function of the value ($CS_{ini}$) of the charge state of the accumulator battery upon the start of discharging.

In this case, the calculation of the estimated value $T_{est}$ of the temperature T is effected by the application of an affine mathematical function, which associates a corresponding temperature T with each charge state CS.

It will be understood that this method is based upon an assumption whereby the temperature T of the accumulator battery 5 will vary in the same manner between a charge of 70% and 60% as between a charge of 60% and 50%.

The value $T_{est}$ is thus obtained by the following calculation:

$$T_{est} = 2 \cdot T_{60} - T_{70}.$$

The final step d) involves the command of the means of heating 8 and of cooling 9 as a function of the value $T_{est}$ estimated in step c), such that the temperature T of the accumulator battery 5 will more rapidly reach the nominal temperature range of said battery (i.e. the temperature range within which the accumulator battery 5 delivers its optimum performance).

This step is effected such that, once the charge state CS has achieved its third value $CS_{50}$, the temperature T of the accumulator battery 5 will achieve a target value $T_{targ}$.

In the example represented in FIG. 2, this target value $T_{targ}$ will be predetermined, such that it lies within the nominal temperature range of the accumulator battery 5.

The electric power ΔP to be delivered to the means of heating 8 (if $T_{targ}$ is greater than $T_{est}$) or to the means of cooling 9 (if $T_{targ}$ is lower than $T_{est}$) in order that the temperature T of the accumulator battery 5 reaches said target value $T_{targ}$ is calculated using the following formula:

$$\Delta P = a \cdot \left( \frac{T_{60} - T_{targ}}{60\% - 50\%} - \frac{T_{70} - T_{60}}{70\% - 60\%} \right) \cdot \frac{dCS}{dt},$$

where a is a coefficient which is dependent upon the type of accumulator battery 5.

In practice, as shown in FIG. 2, this step d) does not permit the exact achievement of the target value $T_{targ}$ for the temperature T, specifically as a result of approximations in the calculation of the electric power ΔP.

Steps b) to d) are therefore repeated in a looped cycle, in this case for every 10% discharge increment in the accumulator battery 5, such that the closest possible matching of the temperature T of the accumulator battery 5 to the target value $T_{targ}$ is achieved.

As indicated above, FIG. 2 represents a discharging cycle of the accumulator battery 5.

In a charging cycle (during which the charge state CS will rise), steps a) to d) will be applied correspondingly, such that the temperature T of the accumulator battery 5 achieves the closest possible match to the target value $T_{targ}$.

The present invention is by no means limited to the form of embodiment described and represented, and a person skilled in the art will be able to incorporate any variant of their choosing.

Specifically, it may be provided that the target value is not predetermined but, conversely, is determined as a function of various parameters.

For example, provision may be included for the determination of the target value as a function of the exterior temperature, the condition of the battery (e.g. as a function of movements in its internal resistance), or of the charging or discharging capacity delivered by the battery. Specifically, the higher the exterior temperature considered, the lower the target value selected may be, in order to take account of the natural rise in temperature once the temperature T has achieved this target value.

Provision may also be made for the determination of the target value as a function of one or other of the first, second and third values of the charge state. Specifically, the higher the charge state considered, the lower the target value selected may be, in order to take account of the residual discharge time (once the temperature T has achieved this target value) during which the battery will continue to heat up.

Provision may also be made for the determination of the target value as a function of notification to the effect that the accumulator battery is charging or discharging. Specifically, if the accumulator battery is charging, the target value may be chosen to be lower, in order to take account of the greater heating-up associated with charging than with discharging.

Provision may also be made for the determination of the target value as a function of the average charging or discharging time of the accumulator battery. In practice, if the user is in the habit of leaving their vehicle on charge for short periods, provision may be made for the reduction of the electric power to be delivered by way of heating or cooling, on the assumption that this short charging period will not permit the nominal temperature range of the accumulator battery to be reached sufficiently rapidly.

According to a further variant for the embodiment of the invention, provision may be made for the delivery of predetermined initial electric power, by way of heating or cooling, upon the start-up of the vehicle, such that the temperature of the accumulator battery achieves the target temperature more rapidly. Accordingly, in the example represented in FIG. 2, provision may be made for the measurement of the temperature value T upon the start-up of the motor, and then, as a function of this value, for the delivery of initial electric power by way of heating or cooling, until such time as the charge state reaches 60%. The electric power delivered thereafter (between 60% and 50%) will then be adapted accordingly, in accordance with the method described above.

According to a further variant for the embodiment of the invention, provision may be made, in step b), for the recording of a greater number of temperature values, e.g. three values, and then, in step c), for the estimation of the temperature value using a non-affine interpolation function which is dependent upon these three values.

The invention claimed is:

1. A method of regulating temperature of an accumulator battery in a course of charging or discharging, the method comprising:
  acquiring successive values of a charge state which is
    relative to a level of charge in the accumulator battery;

measuring, when the charge state successively assumes a first value and a second value, a first and second value of the temperature of the accumulator battery;

estimating, as a function of the values of the measured temperature, a value of the temperature in the accumulator battery once the charge state has achieved a third value determined as a function of the value of the charge state upon a start of discharging; and controlling the temperature of the accumulator battery by increasing heating applied to the accumulator battery via means for heating the accumulator battery or increasing cooling applied to the accumulator battery via means for cooling the accumulator battery as a function of the value of the estimated temperature, the controlling being regulated such that the temperature of the accumulator battery achieves a target value falling within a nominal temperature range of the accumulator battery, wherein the first value and second value of the charge state are predetermined based on a property of the accumulator battery, wherein the target value is determined as a function of an average discharging time or average charging time of the accumulator battery.

2. The regulating method as claimed in claim 1, wherein the acquiring is effected continuously or is repeated at regular time intervals.

3. The regulating method as claimed in claim 1, wherein the measuring, estimating and controlling are repeated in a looped cycle.

4. The regulating method as claimed in claim 1, wherein the first, second, and third values of the charge state are predetermined.

5. The regulating method as claimed in claim 1, wherein at least one of the first, second, and third values of the charge state is determined as a function of the value of the charge state of the accumulator battery at a start of charging or discharging.

6. The regulating method as claimed in claim 1, wherein the estimating is executed using an affine mathematical function which associates a corresponding temperature with each charge state.

7. The regulating method as claimed in claim 1, wherein the target value is determined as a function of an exterior temperature.

8. A motor vehicle comprising:
an accumulator battery;
a charger configured to charge the accumulator battery;
an electric motor supplied by the accumulator battery;
means for acquiring a charge state of the accumulator battery;
means for measuring, when the charge state successively assumes a first value and a second value, a first and second value of the temperature in the accumulator battery;
means for estimating, as a function of the values of the measured temperature, a value of the temperature in the accumulator battery once the charge state has achieved a third value determined as a function of the value of the charge state upon a start of discharging; and
means for controlling the temperature in the accumulator battery by increasing heating applied to the accumulator battery via means for heating the accumulator battery or increasing cooling applied to the accumulator battery via means for cooling the accumulator battery as a function of the value of the estimated temperature, the controlling being regulated such that the temperature of the accumulator battery achieves a target value falling within a nominal temperature range of the accumulator battery, wherein the first value and second value of the charge state are determined in part based on a property of the accumulator battery, wherein the target value is determined as a function of an average discharging time or average charging time of the accumulator battery.

9. A motor vehicle comprising:
an accumulator battery;
a charger configured to charge the accumulator battery;
an electric motor supplied by the accumulator battery;
circuitry configured to control
acquisition of a charge state of the accumulator battery;
measurement, when the charge state successively assumes a first value and a second value, a first and second value of the temperature in the accumulator battery;
estimation, as a function of the values of the measured temperature, a value of the temperature in the accumulator battery once the charge state has achieved a third value determined as a function of the value of the charge state upon a start of discharging; and
the temperature in the accumulator battery by increasing heating applied to the accumulator battery via means for heating the accumulator battery or increasing cooling applied to the accumulator battery via means for cooling the accumulator battery as a function of the value of the estimated temperature, the controlling being regulated such that the temperature of the accumulator battery achieves a target value falling within a nominal temperature range of the accumulator battery, wherein the first value and second value of the charge state are determined in part based on a property of the accumulator battery, wherein the target value is determined as a function of an average discharging time or average charging time of the accumulator battery.

10. The regulating method as claimed in claim 1, wherein the target value is determined as a function of the first value of the charge state, the second value of the charge state, the third value of the charge state.

11. The regulating method as claimed in claim 1, wherein the target value is determined as a function of information indicating that the accumulator battery is charging or discharging.

12. The regulating method as claimed in claim 1, wherein the target value is determined as a function of an average discharging time of the accumulator battery.

13. The regulating method as claimed in claim 1, wherein the target value is determined as a function of an average charging time of the accumulator battery.

14. The regulating method as claimed in claim 1, wherein the property of the accumulator battery is a thermal property.

15. The regulating method as claimed in claim 14, wherein the thermal property is the thermal inertia of the accumulator battery.

16. The regulating method as claimed in claim 1, wherein the controlling controls the temperature of the accumulator battery to achieve the target value when the charge state has achieved the third value.

17. The regulating method as claimed in claim 12, wherein the controlling controls the temperature of the accumulator battery to achieve the target value when the charge state has achieved the third value.

18. The motor vehicle according to claim 8, wherein the means for heating is an electric resistance and the means for cooling is an electric fan.

19. The motor vehicle according to claim 8, wherein the means for heating and the means for cooling are a Peltier cell.

* * * * *